April 25, 1967 H. V. HESS 3,316,172
REMOVING WATER FROM BRINE
Filed Sept. 16, 1963
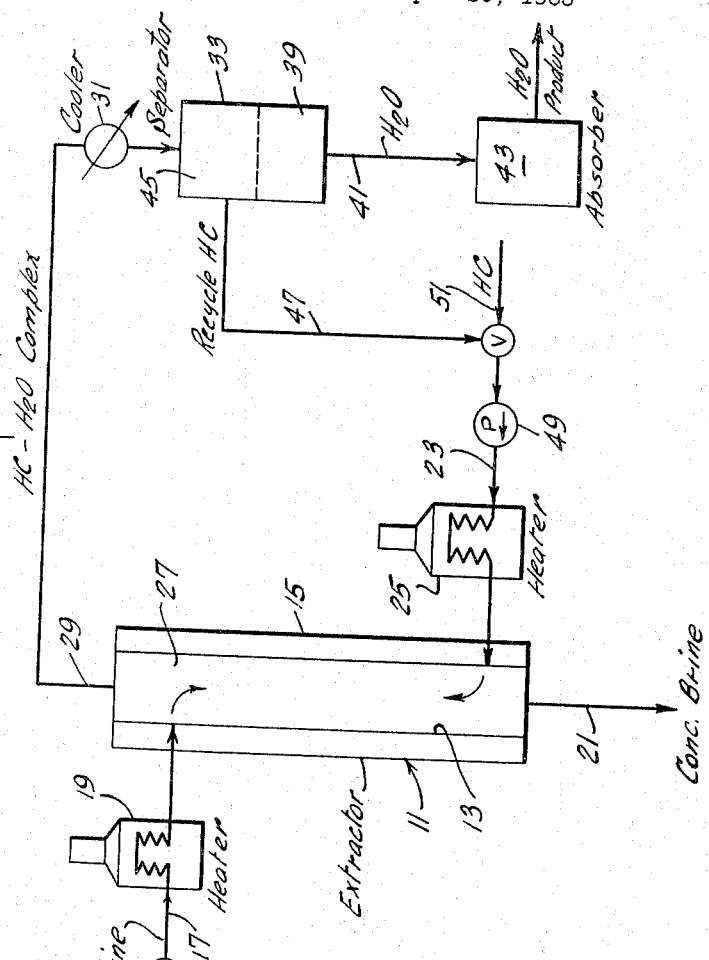
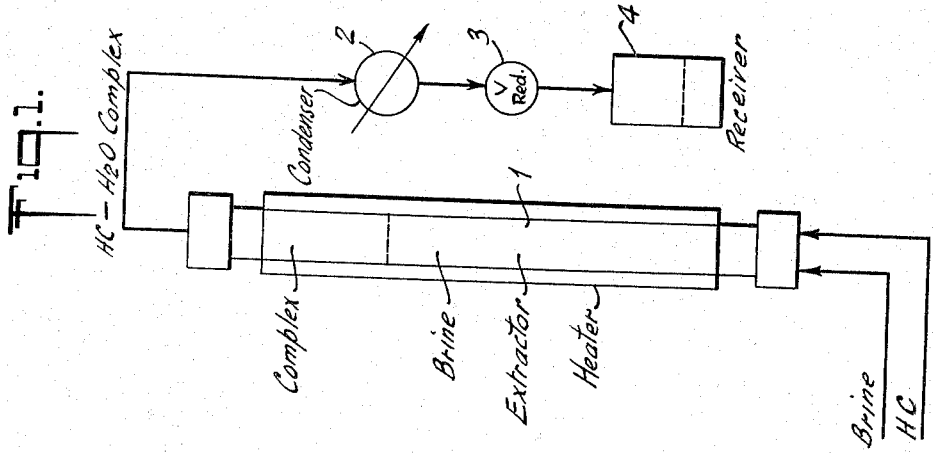

3,316,172
REMOVING WATER FROM BRINE
Howard V. Hess, Glenham, N.Y., assignor to Texaco Inc., New York, N.Y., a corporation of Delaware
Filed Sept. 16, 1963, Ser. No. 310,515
19 Claims. (Cl. 210—59)

This application is a continuation-in-part of my copending patent application, Ser. No. 144,240, filed Oct. 10, 1961, now abandoned.

The present invention relates to a novel process and apparatus for separating fresh water from brine. The process is applicable to the recovery of salt-free water from brines and to the concentration of various brines for the recovery of inorganic compounds contained therein.

In one of its more specific aspects, the present invention is concerned with a process for separating water from brine wherein a hot hydrocarbon liquid under pressure is brought into contact with heated brine to form a complex substantially free from inorganic compounds with water from the brine, separation of the complex from the residual brine, decomposition of the complex into its constituents. The term "brine" is used in a broad sense to denote the entire range of concentrations of water soluble inorganic compounds in water, for example, natural saline water containing sodium chloride, including brackish water, sea water, and saturated or nearly saturated brines, such as the brine in Great Salt Lake or brines obtained from wells. In addition to sodium chloride-containing solutions, other brines to which the process may be applied include aqueous solutions of dissolved mineral salts, for example, halides, carbonates and sulfates of sodium, potassium, lithium, calcium, magnesium, zinc and copper.

The present invention involves a novel desalination process which is dependent upon contact of hot brine with a hot hydrocarbon liquid characterized by the property of extracting a greater amount of water at a high temperature (e.g., at a temperature of 500° F. or above) than at a lower temperature, whereby water is extracted from the brine by the hydrocarbon and forms a complex which is immiscible with the residual brine and may be separated therefrom by gravity. After separation from the residual brine, the complex is decomposed by reducing the temperature sufficiently below the extraction temperature to cause the hydrocarbon and water to separate from one another as two liquid phases; the water phase or the residual brine may be product and the hydrocarbon phase is recycled to the extraction zone.

The term "complex" is used herein to designate the solution of water in hydrocarbon liquid, especially the extract leaving the extraction zone, since it is not entirely certain at this time whether it is a true solution of water in hydrocarbon liquid or a hydrocarbon solution containing a hydrate of the water and hydrocarbon.

For greatest efficiency the present process should be operated at a temperature above 500° F. for the extraction step, after which the temperature is reduced below the extraction temperature for the phase separation step, advantageously by at least 50° below the extraction temperature to assure breaking out the major part of the water. When using aliphatic hydrocarbons, somewhat greater extraction efficiency is obtained if the temperature is kept above 550° F.

By way of illustration, n-decane has the property of extracting 22.2% its weight of water at 575° F., 9% at 550° F., and only 3.3% at 500° F. Consequently, with the extraction process operating at 575° F., and the decomposition step at 500° F., there is a recovery of water in the amount of about 19% of the n-decane.

The operating pressure of the extraction step must be sufficiently high to maintain both the brine and the hydrocarbon in a liquid condition at the operating temperature, normally being greater than 1000 p.s.i.g. and sometimes being as high as 3000 p.s.i.g. Usually the phase break and separation part of the system is at the same operating pressure.

The upper temperature limit should be below the temperature at which vaporization can occur in the extractor to ensure that the fluids in the system are in liquid phase.

Normally liquid hydrocarbons are generally suitable for use in the process of this invention. Hydrocarbons and mixtures of hydrocarbons containing from 6 to 30 carbon atoms per molecule may be used. Hydrocarbons of 8 to 20 carbon atoms, particularly 9 to 12, per molecule are preferred. Various petroleum fractions including kerosene, naphtha, odorless spirits, gasoline, and lubricating oils may be used in the process. Examples of individual hydrocarbon types which can be used in the process of the present invention, either alone or in admixture with one another, are the aliphatic hydrocarbons, including hexane, 2,3-dimethylbutane, heptanes, octanes, isoocatane, nonanes, decanes, propylene tetramer, hexadecane, 2-methyl-1-pentene etc.; naphthenic hydrocarbons, e.g., methylcyclopentane, cyclohexane, methylcyclohexane, dimethylcyclohexane, ethylcyclohexane, tetralin, isopropylcyclohexane, cyclohexene, pinene, etc.; and aromatic hydrocarbons, e.g., benzene, cumene, xylenes, methylnaphthalenes, etc.

Preferred petroleum fractions useful in the present process include normal paraffin hydrocarbons containing 10 to 12 carbon atoms per molecule; isoparaffin hydrocarbons of 12 carbon atoms per molecule, e.g., the bottoms fraction obtained from alkylation of butylenes with isobutane; Udex extract, an aromatic hydrocarbon fraction consisting essentially of hydrocarbons of 9 to 10 carbon atoms per molecule obtained on extraction of petroleum naphtha with a mixture of diethylene glycol and water; propylene tetramer; gasoline fraction hydrocarbons of 10 to 12 carbon atoms per molecule; and naphthenes containing 9 to 10 carbon atoms per molecule.

In the drawings:

FIGS. 1 and 2 are schematic flow diagrams showing simple arrangements of apparatus for performing the invention by co-current flow operation, and by counter-current operation, respectively.

Referring to FIG. 1, brine and hydrocarbon liquid are fed at a high pressure such as 2000 p.s.i.g. into the bottom of a long narrow pipe 1, in the lower portion of which the temperature is maintained at a high value such as above 550° F. by a surrounding electric heater, whereupon a complex of salt-free water with the hydrocarbon is formed and accumulates in an unheated upper portion of the pipe. This complex flows out the top and through a heat exchanger 2 wherein its temperature is reduced well below 550° F., for example, to atmospheric temperature, to decompose the complex and form a water phase and a hydrocarbon phase. The stream then passes through a pressure reducer 3 wherein pressure is reduced to atmospheric, and enters a collecting vessel 4.

Instead of feeding makeup brine to extractor 1, a batch of brine may be extracted, with its level gradually dropping and its salt content increasing.

Product water containing less than 100 p.p.m. salt was obtained by treating 500 cc. batches of real and synthetic sea water (SW) containing about 3% salt in an extractor 1½" inside diameter and 60 inches long containing 29 inches of berl saddles, using the apparatus shown in FIG. 1. Makeup sea water in an amount equal to product water was added in some examples as indicated. Separaon was accomplished by cooling the extract to room temperature. Conditions are set forth in Table I below:

be useful for most industrial processes. However, potability is assured by passing the water through an absorber

TABLE I

| Hydrocarbon | HC Rate, cc./hr. | Extractor | | Water Product, cc./hr.* | Vol. Percent* Water in Extract |
|---|---|---|---|---|---|
| | | Temp., °F. | Pres., p.s.i.g. | | |
| Odorless spirits a | 601 | 625 | 2,500 | b c 165 | 21.5 |
| Kerosene | 600 | 630 | 2,100 | a 230 | 27.8 |
| Do | 150 | 500 | 800 | 6.5 | 4.3 |
| Do | 600 | 625 | 2,100 | b d 335 | 35.9 |
| Cumene | 300 | 500 | 2,000 | 20 | 6.7 |
| o-Xylene | 300 | 575 | 2,000 | 35 | 11.6 |
| Do | 300 | 625 | 2,100 | 72 | 24.0 |
| Do | 300 | 640 | 2,650 | 98 | 32.6 |

* Averages:
a Alkylation bottoms: $C_{12}$ plus isomeric paraffins.
b Equivalent amount of SW added.
c 15 hour period.
d 16 hour period.

The improvement effected by increasing temperature is illustrated above, o-xylene, showing a 5-fold increase in product when operating at 640° F. as compared to 500° F.

Referring to FIG. 2, there is shown a continuous extractor 11 comprising a central column 13 comprising an extraction zone surrounded by a jacket 15 through which hot gases may be passed, if desired, or which can be filled with a heat insulating material, alternatively. Jacket 15 also may be used for cooling where the heat of solution is such that temperature tends to rise too high.

Brine from a supply line 17 is passed at a high pressure such as 200 p.s.i.g. through a heater 19 wherein its temperature is raised to a high level such as 600° F. without vaporization, and is then passed into the upper half of column 13 at a point near its top so as to flow downwardly and then out the bottom through a discharge conduit 21. The leaving brine is quite concentrated, containing as much as 10–20% salt.

A suitable hydrocarbon, such as kerosene, is passed at a similarly high pressure by way of a conduit 23 through a second heater 25 wherein its temperature is raised to a high level such as 630° F., after which it is passed into the lower half of column 13 near its bottom and, due to its lower specific gravity than brine, flows upwardly in lower specific gravity than brine, flows upwardly in countercurrent direct contact with the downwardly flowing brine. As the two liquids pass in contact with one another, a complex of hydrocarbon and water (which is substantially free from salt) is formed and, due to its lower specific gravity than the brine, accumulates in the space 27 at the top of column 13 above the brine inlet.

The complex flows out the top of column 13 through a conduit 29 and passes through a cooler 31 to effect phase separation, and then into a separator 33.

In the separator 33 there is formed a body of liquid comprising a lower phase 39 which is almost pure water, and an upper phase 45 which is almost pure liquid hydrocarbon. The water is drawn off the bottom through a conduit 41 and recovered as product. Ordinarily this water is free enough from hydrocarbon impurity so as to 43 containing an adsorbent such as activated carbon which adsorbs hydrocarbon impurities.

The upper layer 45 of separated hydrocarbon is passed through a conduit 47, pump 49, and heater 25 back into the extractor 11 for reuse in the process. Makeup hydrocarbon is added through a supply line 51 as needed.

Product water containing less than 100 p.p.m. salt was obtained by countercurrent extraction of sea water (SW) containing about 3% salt in an unpacked extractor 1½ inches inside diameter and 60 inches long. Separation was accomplished by cooling to room temperature. Pressure was reduced to atmospheric, and there was no recycle of hydrocarbons. Conditions are set forth in Table II below:

TABLE II

| Hydrocarbon | HC Rate, cc./hr. | SW Rate, cc./hr. | Extractor | | Products | |
|---|---|---|---|---|---|---|
| | | | Temp., °F. | Pres., p.s.i.g. | Water, cc./hr. | Brine, cc./hr. |
| Benzene | 3,000 | 520 | 500 | 1,800 | 480 | 40 |
| Cumene | 600 | 236 | 540 | 2,000 | 151 | 85 |
| o-Xylene | 1,600 | 460 | 575 | 2,850 | 360 | 100 |
| Odorless spirits 1 | 3,250 | 422 | 584 | 2,000 | 364 | 58 |
| 50% n-Decane, 50% n-Undecane | 1,550 | 420 | 611 | 2,500 | 378 | 42 |

1 Alkylation bottoms: $C_{12}$ plus isomeric paraffins.

"Norwalk" sea water containing about 3% salt was extracted with methylcyclohexane in an unpacked tower having an inside diameter of 1½ inches and a length of 72 inches.

The following table lists the conditions and results.

TABLE III.—CONTINUOUS EXTRACTION OF FRESH WATER FROM SEA WATER WITH METHYLCYCLOHEXANE IN A 1½" x 72" TOWER

Temp., °F. ------------------------------- 575
Pressures, p.s.i.g. --------------------------- 2000
Charge rates:
   MCH cc./hr. ---------------------------- 585
   Sea water cc./hr. ----------------------- 124
Duration, hr. ------------------------------- 25
Vol. percent water in extract ---------------- 13.65
Vol. percent fresh water extracted ----------- 51.3

The process described in connection with FIGS. 1–2 can be operated with either the brine or the hydrocarbon liquid as the continuous phase. It is particularly advantageous to operate with the hydrocarbon liquid as the continuous phase because scale accumulation (from $CaSO_4$ and $MgSO_4$ in the brine) is prevented, and because corrosion of metal is reduced when the metal walls are wet with hydrocarbon.

On the other hand, superior heat exchange is obtained when the continuous phase liquid is that liquid which is used in smaller volume, which is usually the brine; (this is because there are formed more bubbles of the larger volume liquid than bubbles of the smaller volume liquid in the reverse arrangement).

While the invention has been described above with its primary object the recovery of salt-free water from brine, it is evident that the highly concentrated brine leaving the bottom of the extractor may have commercial value and may be the primary product of the process or a valuable by-product. Brines contain sodium chloride and often contain such other commercially valuable salts, such as magnesium, bromine and iodine salts which may be extracted from the concentrated brine product of the process.

I claim:

1. A process for extracting water from brine comprising bringing into contact with one another in an extraction zone hot brine and a hot hydrocarbon liquid consisting essentially of hydrocarbons containing not less than 6 and not more than 30 carbon atoms per molecule characterized by the ability to extract more water at a high temperature than at a lower temperature thereby extracting water into said hydrocarbon liquid and forming a complex therewith, removing said complex from contact with residual brine, cooling said complex to form a water phase and hydrocarbon phase, and separating said water phase from said hydrocarbon phase.

2. A process in accordance with claim 1 wherein the operating pressure is sufficiently high to maintain said brine, said water and said hydrocarbon liquid in liquid phase.

3. A process in accordance with claim 1, also comprising heating and recycling said hydrocarbon phase in a liquid condition to said extraction zone into contact with said brine as said hot hydrocarbon liquid.

4. A process according to claim 1 wherein said hydrocarbon liquid is maintained as a continuous phase in said contacting zone.

5. A process according to claim 1 wherein said brine is present as a continuous phase in said contacting zone.

6. A process in accordance with claim 1, also comprising removing any residual hydrocarbon liquid from said recovered water phase.

7. A process in accordance with claim 2, wherein said hot brine and said hot hydrocarbon liquid are at an extraction temperature above 500° F. but below the apparent critical temperature of said hydrocarbon and wherein the temperature of said complex is reduced at least 50° below said extraction temperature to effect said phase separation.

8. A process in accordance with claim 7 wherein the pressure is above 1000 p.s.i.g.

9. A process in accordance with claim 1 wherein said hydrocarbon liquid and said brine are supplied as flowing streams to said extraction zone.

10. A process in accordance with claim 9 wherein said hydrocarbon liquid and said brine flow co-currently in said extraction zone.

11. A process in accordance with claim 9 wherein said hydrocarbon liquid and said brine flows countercurrently in said extraction zone.

12. A process according to claim 1 wherein said hydrocarbon liquid consists essentially of isoparaffin hydrocarbons of at least 12 carbon atoms per molecule obtained as bottoms from the alkylation of butylenes with isobutane.

13. A process according to claim 1 wherein said hydrocarbon liquid consists essentially of hydrocarbons containing not less than 10 and not more than 12 carbon atoms per molecule.

14. A process according to claim 1 wherein said hydrocarbon liquid is propylene tetramer.

15. A process according to claim 1 wherein said hydrocarbon liquid consists essentially of aromatic hydrocarbons of 9 to 10 carbon atoms per molecule.

16. A process according to claim 1 wherein said hydrocarbon liquid consists essentially of naphthenes of 9 to 10 carbon atoms per molecule.

17. A process for extracting water from brine comprising:
   (a) bringing into contact with one another in an extraction zone at an elevated temperature and a pressure sufficient to maintain liquid brine in said extraction zone, hot brine and a hot organic liquid characterized by the ability to extract more water at a high temperature than at a lower temperature thereby extracting substantially pure water into said organic liquid and forming a complex therewith immiscible with said brine;
   (b) separating said complex from residual brine;
   (c) decomposing said complex into a water phase and an organic liquid phase by reducing the temperature of said complex by at least 50° F.;
   (d) and separating said water phase from said organic liquid phase.

18. A process in accordance with claim 17 wherein said elevated temperature is above 500° F. and said pressure is above 1000 p.s.i.g.

19. A process in accordance with claim 18, comprising reheating said organic liquid phase and recycling said organic phase in a liquid condition back into contact with brine in said extraction zone, for further extraction of water.

References Cited by the Examiner

UNITED STATES PATENTS

| 2,298,791 | 10/1942 | Harrington | 208—311 |
| 2,967,825 | 1/1961 | Baniel | 210—21 |

OTHER REFERENCES

Progress Report No. 22: Research on Liquid-Liquid Extraction For Saline Water Conversion, United States Department of the Interior, Office of Saline Water, December 1958, pp. 1–10 relied upon.

MORRIS O. WOLK, *Primary Examiner.*

E. G. WHITBY, *Assistant Examiner.*

UNITED STATES PATENT OFFICE
CERTIFICATE OF CORRECTION

Patent No. 3,316,172                                                      April 25, 1967

Howard V. Hess

It is hereby certified that error appears in the above numbered patent requiring correction and that the said Letters Patent should read as corrected below.

Column 3, line 33, for "200" read -- 2000 --.

Signed and sealed this 21st day of November 1967.

(SEAL)
Attest:

Edward M. Fletcher, Jr.                                      EDWARD J. BRENNER

Attesting Officer                                                    Commissioner of Patents